United States Patent Office 3,204,005
Patented Aug. 31, 1965

3,204,005
HYDROCARBON CONVERSION PROCESS AND
CATALYST THEREFOR
William G. Nixon, Westchester, Ill., assignor to Universal Oil Products Company, Des Plaines, Ill., a corporation of Delaware
No Drawing. Filed May 13, 1963, Ser. No. 280,093
19 Claims. (Cl. 260—671)

This application is a continuation-in-part of my copending application Serial No. 59,175, filed September 29, 1960, now U.S. Patent No. 3,130,244 and my copending application Serial No. 274,810, filed April 22, 1963.

This invention relates to a process for the conversion of organic aromatic compounds and more particularly to a process for converting alkylatable aromatic compounds into more useful compounds. More specifically this invention is concerned with a process for the alkylation of an alkylatable aromatic compound with an olefin-acting compound utilizing a novel catalytic composition of matter.

An object of this invention is to produce alkylated aromatic hydrocarbons, and more particularly, to produce monoalkylated benzene hydrocarbons. A specific object of this invention is a process for the production of ethylbenzene, a desired chemical intermediate, which ethylbenzene is utilized in large quantities in dehydrogenation processes for the manufacture of styrene, one of the starting materials for the production of resins and some synthetic rubber. Another specific object of this invention is to produce alkylated aromatic hydrocarbons boiling within the gasoline boiling range having high anti-knock value and which may be used as such or as a component of gasoline suitable for use in automobile and airplane engines. A further specific object of this invention is a process for the production of cumene by the reaction of benzene with propylene in the presence of a novel catalytic composition of matter, which cumene product is oxidized in large quantities to form cumene hydroperoxide which is readily decomposed into phenol and acetone. Another object of this invention is to provide a process for the introduction of alkyl groups into aromatic hydrocarbons of high vapor pressure at normal conditions with minimum loss of said high vapor pressure aromatic hydrocarbons and maximum utilization thereof in the process utilizing a novel catalytic composition of matter.

One embodiment of this invention resides in a conversion process which comprises alkylating an alkylatable aromatic compound with an olefin-acting compound in the presence of a catalyst comprising an oxide of nitrogen selected from the group consisting of nitric acid, nitrous acid, ammonium nitrate, ammonium nitrite and metallic oxides of nitrogen composited on a solid support.

A further embodiment of this invention resides in a conversion process which comprises alkylating an alkylatable aromatic compound with an olefin-acting compound at a temperature in the range of from about —10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

A still further embodiment of the invention is found in a conversion process which comprises alkylating an alkylatable aromatic compound with an olefin-acting compound at a temperature in the range of from about —10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous alumina support having a surface area in excess of 25 square meters per gram.

A specific embodiment of this invention resides in a conversion process which comprises alkylating benzene with ethylene at a temperature in the range of from about —10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

A more specific embodiment of the invention resides in a conversion process which comprises alkylating benzene with ethylene at a temperature in the range of from about —10° to about 300° C. and at a pressure in the range of from about atmospheric to about 200 atmospheres in the presence of a catalyst comprising an oxide of nitrogen derived from cobalt nitrate composited on a substantially anhydrous silica support having a surface area in excess of 25 square meters per gram.

It has now been discovered that aromatic compounds and particularly alkylatable aromatic compounds may be converted to other and more useful compounds by contacting said alkylatable aromatic compound with an olefin-acting compound in the presence of certain catalytic compositions of matter. Examples of alkylatable aromatic compounds which may be converted according to the process of this invention include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzenes, triethylbenzenes, normal propylbenzene, isopropylbenzene, etc. Preferred alkylatable aromatic compounds are monocyclic aromatic hydrocarbons, that is, benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as detergent alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often alkylate is obtained as a high boiling fraction in which the alkyl group attached to the aromatic nucleus varies in size from about $C_9$ to $C_{18}$. Other suitable aromatic hydrocarbons, which at specified alkylation conditions, depending upon the melting point of the aromatic chosen, would be in liquid form, would include those aromatic hydrocarbons with two or more aryl groups such as diphenyl, diphenylmethane, naphthalene, triphenyl, triphenylmethane, fluorene, stilbene, etc. Examples of other aromatic hydrocarbons utilizable within the scope of thise invention which at specified alkylation conditions, depending upon the melting point of the aromatic chosen, would be in liquid form, include those containing condensed aromatic rings. These include naphthalene, alkyl naphthalenes, anthracene, phenanthracene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

The olefin-acting compound, acting as the alkylating agent, may be selected from diverse materials including mono-olefins, diolefins, polyolefins, acetylinic hydrocarbons, and also alcohols, ethers, and esters, the latter including alkyl halides, alkyl sulfates, alkyl phosphates, and various esters of carboxylic acids. The preferred olefin-acting compounds are olefinic hydrocarbons which comprise mono-olefins containing one double bond per molecule and polyolefins which contain more than one double bond per molecule. Mono-olefins which are utilized as olefin-acting compounds in the process of the present invention are either normally gaseous or normally liquid and include ethylene, propylene, 1-butene, 2-butene, isobutylene, and higher molecular weight normally liquid olefins such as the various pentenes, hexenes, heptenes, octenes, and mixtures thereof, and still higher molecular weight liquid olefins, the latter including various olefin polymers having from about 9 to about 18 carbon atoms per molecule including propylene trimer, propylene tetramer, propylene pentamer, etc. Cyclo olefins such as cyclopentene, methylcyclopentene, cyclohexene, methylcyclohexene, etc., may also be utilized. Also included within the scope of the olefin-acting compound are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include ethyl fluoride, n-propyl fluoride, isopropyl fluoride, n-butyl fluoride, isobutyl fluoride, sec-butyl fluoride, tert-butyl fluoride, etc., ethyl chloride, n-propyl chloride, isopropyl chloride, n-butyl chloride, isobutyl chloride, sec-butyl chloride, tert-butyl chloride, etc.; ethyl bromide, n-propyl bromide, isopropyl bromide, n-butyl bromide, isobutyl bromide, sec-butyl bromide, tert-butyl bromide, etc. As stated hereinabove, other esters such as alkyl sulfates including ethyl sulfate, propyl sulfate, etc., and alkyl phosphates including ethyl phosphates, etc., may be utilized. Ethers such as diethyl ether, ethyl propyl ether, dipropyl ether, etc., are also included within the generally broad scope of the term olefin-acting compound and may be successfully utilized as alkylating agents in the process of this invention.

In addition, the process of this invention may be successfully applied to and utilized for complete conversion of olefin hydrocarbons when these olefin hydrocarbons are present in minor quantities in various gas streams. Thus, the normally gaseous olefin for use in the process of this invention need not be concentrated. Such normally gaseous olefin hydrocarbons appear in minor quantities in various refinery gas streams, usually diluted with gases such as hydrogen, nitrogen, methane, ethane, propane, etc. These gas streams containing minor quantities of olefin hydrocarbons are obtained in petroleum refineries from various refinery installations including thermal cracking units, catalytic cracking units, thermal reforming units, coking units, polymerization units, dehydrogenation units, etc. Such refinery gas streams have in the past often been burned for fuel value, since an economical process for the utilization of their olefin hydrocarbon content has not been available. This is particularly true for refinery gas streams known as off-gas streams containing relatively minor quantities of olefin hydrocarbons such as ethylene, propylene, etc.

As hereinbefore set forth, the invention is concerned with a conversion process for the alkylation of alkylatable aromatic compounds, said process being effected in the presence of a catalyst which possesses a high degree of hydrocarbon conversion activity and is particularly effective as an alkylation catalyst for the alkylatable aromatic compounds hereinabove set forth. The catalyst comprises an oxide of nitrogen composited on and chemically bonded to a solid support. However, not every solid support can be utilized as a satisfactory one for disposal of an oxide of nitrogen thereon. The particular solid support which is to be utilized should possess a relatively high surface area and be substantially anhydrous or relatively free of water. In most cases this freedom from water of the support is achieved by a precalcination treatment of said support. This precalcination is carried out at a relatively high temperature in the range of from about 400° C. to about 700° C. and for a time sufficient to effect substantial removal of adsorbed or combined water from the support. The time required for the dehydration will vary depending upon the support, and in addition, will depend upon whether the water is in a combined or in merely a physically adsorbed form. As hereinbefore set forth, the support is preferably although not necessarily, characterized by having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the oxides of nitrogen in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram and which has been freed from adsorbed water and which contains little combined water, is a satisfactory support. Celite, a naturally occurring mineral, after precalcination, is not a satisfactory support. Celite has a surface area from about 2 to about 10 square meters per gram. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta-, and theta-alumina, although these are not necessarily of equivalent suitability. However, as is obvious from the above discussion, the limitation on the use of any particular support is one of freedom from combined or adsorbed water in combination with the high surface area of the support selected. In addition to the aforementioned gamma-, eta-, and theta-aluminas which may be utilized as solid supports, it is also contemplated that other refractory oxides which posses the necessary surface area characteristics and which are in a substantially anhydrous state such as silica or combinations thereof such as silica-alumina, silica-magnesia, alumina-silica-magnesia, alumina-thoria, alumina-zirconia, etc., may also be utilized as solid supports for the various oxides of ntirogen hereinafter enumerated which may be impregnated thereon or chemically composited therewith.

Oxides of nitrogen which are composited with the solid support hereinabove set forth include metallic oxides of nitrogen of which the metallic portion of the compound preferably comprises a metal capable of forming an oxide of nitrogen of Group VI of the Periodic Table, a metal of the iron group of Group VIII as well as alumina, etc.; such metallic oxides including aluminum nitrate, nickel nitrate, chromium nitrate, cobalt nitrate, ferric nitrate, etc. In addition to the hereinabove enumerated metallic oxides of nitrogen it is also contemplated within the scope of this invention that a refractory oxide support of the type hereinbefore set forth may be impregnated with a solution of ammonium nitrate, ammonium nitrite or with a solution of nitric acid or nitrous acid followed by the addition of a sufficient amount of ammonium hydroxide to render the composite alkaline in nature. Following the impregnation, the support is then calcined thereby driving off the ammonia and allowing the nitrate or nitrite to remain impregnated on and chemically bonded to the refractory oxide support. In addition to the aforesaid oxides of nitrogen, the refractory oxide support may be also impregnated with concentrated nitric acid or nitrous acid without any further neutralization steps, said acid being utilized in an amount sufficient so that the final catalytic composite possesses from about 0.5 to about 15% by weight of nitrate or nitrite content.

The addition of the oxide of nitrogen to the refractory oxide support will enhance the surface-area characteristics of the support. The surface-area characteristics are defined as the surface area, expressed as square meters per gram; pore volume expressed as cubic centimeters per gram; and pore diameter expressed in Angstrom units (A.). It has been found that refractory inorganic oxides possessing greater surface area, coupled with a smaller pore diameter, results in improved adsorptive capacity, especially when serving as an alkylating agent. As hereinbefore set forth, certain forms of alumina which possess the desired surface area characteristics may be utilized as the refractory oxide supports for the catalyst of this invention. The base alumina may be prepared by any of the well-known means of manufacture, one example of which is the addition of an alkaline reagent to a salt of aluminum in an amount sufficient to form aluminum hydroxide which upon drying and calcining, is converted to alumina. Likewise, if silica is to be utilized as the refractory oxide support it may be prepared by acidification of water glass. Similarly, if the refractory oxide support comprises both alumina and silica these components may be prepared by separate, successive or coprecipitate means.

The catalyst which is utilized in the process of the present invention may be prepared by any method known in the art. For example, a refractory oxide base previously prepared by the methods hereinbefore set forth is then combined with an oxide of nitrogen by conventional means such as treating the base with a solution of said oxide of nitrogen, said oxide of nitrogen being added in amount sufficient to allow the finished catalyst to contain from about 0.5 to about 15% or more by weight of nitrate or nitrite. Following this, the combined material is then dried by air oxidation in a furnace tube or muffle furnace, etc. The finished catalyst comprising the oxide of nitrogen composite on the refractory oxide support is then utilized as a conversion catalyst, and especially as an alkylation catalyst in the usual manner.

The process of this invention utilizing the catalyst hereinbefore set forth may be effected in any suitable manner and may comprise either a batch or a continuous type of operation. The preferred method by which the process of this invention may be effected is a continuous type of operation. One particular method is the fixed bed operation in which the alkylatable aromatic compound and the olefin-acting compound are continuously charged to a reaction zone containing a fixed bed of the desired catalyst, said zone being maintained at the proper operating conditions of temperature and pressure, that is, a temperature in the range of from about −10° to about 300° C., and a pressure including a pressure of from about atmospheric to about 200 atmospheres or more. The liquid hourly space velocity (the volume of charge per volume of catalyst per hour) is maintained in the reaction zone in the range of from about 0.1 to about 20 or more, and preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in either an upward or downward flow and the alkylated product is continuously withdrawn, separated from the reactor effluent, and recovered, while any unreacted starting materials may be recycled to form a portion of the feed stock. It is also contemplated within the scope of this invention that reaction gases such as hydrogen, nitrogen, argon, oxygen, air, etc., may also be charged to the reaction zone if necessary. Another continuous type of operation comprises the moving bed type in which the reactants and the catalyst bed move either concurrently or countercurrently to each other while passing through said reaction zone. Yet another continuous type of operation which may be used is the slurry type in which the catalyst may be carried into the reaction zone as a slurry in one or the other of the reactants.

Still another type of operation which may be used is the batch type of operation in which a quantity of the alkylatable aromatic compound and the olefin-acting compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means such as, for example, by washing, drying, fractional distillation, crystallization, etc.

It is also contemplated within the scope of this invention that the catalyst of the type hereinbefore set forth may be utilized for promoting miscellaneous organic reactions, the catalyst being employed in essentially the same way as when used for alkylating alkylatable aromatic compounds in that the reactions are essentially in suspension in liquid phase in various types of equipment. Typical cases of reactions in which the present type of catalyst may be used include the polymerization of olefinic hydrocarbons such as the butylenes, etc.; the alkylation of cyclic compounds with olefins, the cyclic compounds including aromatics, polycyclic compounds, naphthenes, and phenols; condensation reaction such as those occurring between ethers and aromatics, etc.; reactions involving the hydrohalogenation of unsaturated organic compounds; isomerization reactions in which the double bond of an olefinic hydrocarbon may be shifted to a more centralized position in the chain or in which the carbon skeleton arrangement of the compound may undergo rearrangement; ester formation by the interaction of carboxylic acids and olefins; and the like. The specific procedures for utilizing the present type of catalyst in miscellaneous organic reactions will be determined by the chemical and physical characteristics and the phase of the reacting constituents.

The following examples are given to illustrate the process of the present invention, which, however, are not intended to limit the generally broad scope of the present invention in strict accordance therewith.

*Example I*

In this example, about 100 cc. of alumina spheres were placed in a glass furnace tube and treated with dry air while increasing the temperature to 300° C. The furnace was maintained at 300° C. while the air oxidizing was continued. The furnace was maintained at 300° C. for an additional 30 minutes during which time the alumina was treated with a mixture of 100 cc. of nitric oxide gas per minute and 600 cc. of air per minute. After this treatment, the system was then treated with 600 cc. of air per minute for 30 minutes at 300° C. The system was then cooled to room temperature and a catalyst sample was taken. This catalyst was designated as catalyst "A."

*Example II*

Anther catalyst is prepared by impregnating 50 grams of alumina spheres with about 85 cc. of a solution containing 5 cc. of concentrated nitric acid. The resulting composite is then adjusted to a pH of about 9.0 using ammonium hydroxide. Following this, the composite is then placed in a furnace tube which is slowly heated to a temperature of about 300° C. and maintained at this temperature for a period of about 2 hours while air oxidizing the composite using approximately 800 cc. of air per minute. During the heating of the composite to the desired temperature it will be noted that ammonia gas is evolved from the catalyst thereby leaving an oxide of nitrogen on the refractory oxide base. The finished catalyst will contain about 10 weight percent nitrate.

*Example III*

Yet another catalyst is prepared by impregnating alumina spheres with a solution containing concentrated nitric acid after which the composite is dried to remove excess water. Following this the composite is placed in a furnace tube and air oxidized to a catalyst temperature of 300° C. using 800 cc. of air per minute. The finished catalyst will contain approximately 6 weight percent nitrate.

*Example IV*

A catalyst similar to those set forth in the above examples is prepared by compositing a cobalt nitrate solution containing approximately 15% cobalt nitrate with a refractory oxide base comprising alumina spheres. The resulting composite is then placed in a muffle furnace or furnace tube and is slowly heated to a temperature of about 300° C. Upon reaching this temperature, the catalyst is air oxidized using approximately 800 cc. of air per minute for an additional period of about 1 hour. The catalyst will contain about 6 weight percent nitrate.

*Example V*

The catalyst prepared according to Example I above and designated as catalyst "A" is utilized in an appropriate alkylation apparatus to determine the alkylation activity of said catalyst. In the experiment, 100 grams of the finished catalyst is placed in the alkylation reaction zone and benzene and ethylene are charged separately to the alkylation zone. The reactor is maintained at about 1000 p.s.i.g. and about 100° C. The product is analyzed for olefins using a mass spectrometer and it is found that the product comprises ethylbenzene, diethylbenzene, polyethylbenzenes, toluene and unreacted benzene.

*Example VI*

The catalyst prepared acording to Example II is utilized in an appropriate alkylation apparatus to determine the alkylation activity of said catalyst. In the experiment, 50 grams of the finished catalyst is placed in the alkylation reaction zone and benzene and ethylene are charged separately to the alkylation zone. The reactor is maintained at about 1000 p.s.i.g. and 125° C. Substantially complete conversion of the ethylene is obtained as is evidenced by mass spectrometer analysis. The product comprises ethylbenzene, diethylbenzene, polyethylbenzenes, and unreacted benzene.

*Example VII*

The catalyst prepared according to Example III is utilized in an appropriate alkylation apparatus to determine the alkylation activity of said catalyst. In the experiment, 50 grams of the finished catalyst is placed in the alkylation reaction zone and benzene and propylene are charged separately thereto. The reactor is maintained at about 1000 p.s.i.g. and 80° C. Substantially complete conversion of the propylene is obtained. The product is analyzed for olefins using a mass spectrometer and it is found that the product comprises cumene, dipropylbenzene, polyproplybenzenes, and unreacted benzene.

*Example VIII*

The catalyst prepared according to Example IV is utilized in the alkylation apparatus described in the previous examples to determine the alkylation activity of said catalyst. In the experiment, 100 grams of the finished catalyst is placed in the alkylation reaction zone which is maintained at a pressure of about 1050 p.s.i.g. and a temperature in the range of from about 100° C. to about 200° C. Benzene and a synthetic refinery-off gas similar to that normally obtained from a catalytic cracking unit are charged separately to the alkylation reaction zone. The composition of the synthetic off-gas is as follows: carbon dioxide, 0.1 mole percent; nitrogen, 29.0 mole percent; carbon monoxide, 1.3 mole percent; hydrogen, 18.9 mole percent; methane, 35.0 mole percent; ethylene, 12.0 mole percent; ethane, 0.5 mole percent; propylene, 2.5 mole percent; propane, 0.1 mole percent; isobutane, 0.1 mole percent, and acetylene, 0.5 mole percent. The plant liquid effluent is tested for unsaturation and is found to have a very low bromine index indicating the substantial absence of olefin. The product comprises ethylbenzene, diethylbenzene, polyethylbenzenes, cumene, diisopropylbenzene, polypropylbenzenes and 1,1-diphenylethane.

I claim as my invention:

1. A conversion process which comprises alkylating an alkylatable aromatic hydrocarbon with an olefin-acting compound in the presence of a catalyst comprising an oxide of nitrogen selected from the group consisting of nitric acid, nitrous acid, ammonium nitrate, ammonium nitrite and metallic oxides of nitrogen composited on a substantially anhydrous solid support having a surface area in excess of 25 square meters per gram.

2. A conversion process which comprises alkylating an alkylatable aromatic hydrocarbon with an olefin-acting compound at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous solid support having a surface area in excess of 25 square meters per gram.

3. A conversion process which comprises alkylating an alkylatable aromatic hydrocarbon with an olefin-acting compound at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

4. A conversion process which comprises alkylating an alkylatable aromatic hydrocarbon with an olefin-acting compound at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous alumina support having a surface area in excess of 25 square meters per gram.

5. A conversion process which comprises alkylating an alkylatable aromatic hydrocarbon with an olefin-acting compound at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous alumina-silica support having a surface area in excess of 25 square meters per gram.

6. A conversion process which comprises alkylating an alkylatable aromatic hydrocarbon with an olefin-acting compound at a temperature in the range of from about −10° to about 300° C. and at a pressure in the range of from about atmospheric to about 200 atmospheres in the presence of a catalyst comprising an oxide of nitrogen derived from nitric acid composited on a substantially anhydrous alumina support having a surface area in excess of 25 square meters per gram.

7. A conversion process which comprises alkylating an alkylatable aromatic hydrocarbon with an olefin-acting compound at a temperature in the range of from about −10° to about 300° C. and at a pressure in the range of from about atmospheric to about 200 atmospheres in the presence of a catalyst comprising an oxide of nitrogen derived from aluminum nitrate composited on a substantially anhydrous silica support having a surface area in excess of 25 square meters per gram.

8. A conversion process which comprises alkylating an alkylatable aromatic hydrocarbon with an olefin-acting compound at a temperature in the range of from about −10° to about 300° C. and at a pressure in the range of from about atmospheric to about 200 atmospheres in the presence of a catalyst comprising an oxide of nitrogen derived from cobalt nitrate composited on a substantially anhydrous alumina support having a surface area in excess of 25 square meters per gram.

9. A conversion process which comprises alkylating an alkylatable aromatic hydrocarbon with an olefin-acting compound at a temperature in the range of from about −10° to about 300° C. and at a pressure in the range of from about atmospheric to about 200 atmospheres in the presence of a catalyst comprising an oxide of nitrogen derived from nickel nitrate composited on a substantially anhydrous silica support having a surface area in excess of 25 square meters per gram.

10. The process of claim 3 further characterized in that said alkylatable aromatic hydrocarbon is a benzene hydrocarbon.

11. The process of claim 3 further characterized in that said olefin-acting compound is an olefinic hydrocarbon.

12. The process of claim 3 further characterized in that said olefin-acting compound is a normally gaseous olefin.

13. A conversion process which comprises alkylating benzene with ethylene at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

14. A conversion process which comprises alkylating benzene with propylene at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

15. A conversion process which comprises alkylating benzene with butylene at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

16. A conversion process which comprises alkylating benzene with a refinery-off gas at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

17. A conversion process which comprises alkylating benzene with ethylene at a temperature in the range of from about −10° to about 300° C. and at a pressure in the range of from about atmospheric to about 200 atmospheres in the presence of a catalyst comprising an oxide of nitrogen derived from aluminum nitrate composited on a substantially anhydrous alumina-silica support having a surface area in excess of 25 square meters per gram.

18. A conversion process which comprises alkylating benzene with ethylene at a temperature in the range of from about −10° to about 300° C. and at a pressure in the range of from about atmospheric to about 200 atmospheres in the presence of a catalyst comprising an oxide of nitrogen derived from cobalt nitrate composited on a substantially anhydrous silica support having a surface area in excess of 25 square meters per gram.

19. A conversion process which comprises alkylating benzene with ethylene at a temperature in the range of from about −10° to about 300° C. and at a pressure in the range of from about atmospheric to about 200 atmospheres in the presence of a catalyst comprising an oxide of nitrogen derived from chromium nitrate composited on a substantially anhydrous alumina support having a surface area in excess of 25 square meters per gram.

References Cited by the Examiner

UNITED STATES PATENTS 2,927,903   3/60   Nixon _____ 252—438 X

ALPHONSO D. SULLIVAN, *Primary Examiner.*